(12) United States Patent
Gu et al.

(10) Patent No.: US 11,801,491 B1
(45) Date of Patent: Oct. 31, 2023

(54) THREE-WAY CATALYST WITH REDUCED PALLADIUM LOADING AND METHOD OF MAKING THE THREE-WAY CATALYST

(71) Applicants: GM GLOBAL TECHNOLOGY OPERATIONS LLC, Detroit, MI (US); University of Central Florida Research Foundation, Inc., Orlando, FL (US); BASF Corporation, Iselin, NJ (US)

(72) Inventors: Yuntao Gu, Farmington Hills, MI (US); Fudong Liu, Oviedo, FL (US); Wei Li, Troy, MI (US); Shaohua Xie, Orlando, FL (US); Yuejin Li, Iselin, NJ (US); Xiaolai Zheng, Iselin, NJ (US)

(73) Assignees: GM GLOBAL TECHNOLOGY OPERATIONS LLC, Detroit, MI (US); University of Central Florida Research Foundation, Inc., Orlando, FL (US); BASF Corporation, Iselin, NJ (US)

( * ) Notice: Subject to any disclaimer, the term of this patent is extended or adjusted under 35 U.S.C. 154(b) by 0 days.

(21) Appl. No.: 17/725,828

(22) Filed: Apr. 21, 2022

(51) Int. Cl.
 *B01J 21/04* (2006.01)
 *B01J 23/10* (2006.01)
 (Continued)

(52) U.S. Cl.
 CPC .............. *B01J 23/44* (2013.01); *B01J 6/001* (2013.01); *B01J 21/04* (2013.01); *B01J 23/10* (2013.01);
 (Continued)

(58) Field of Classification Search
 CPC ... B01J 21/04; B01J 23/10; B01J 23/44; B01J 23/63; B01J 35/0006; B01J 35/04;
 (Continued)

(56) References Cited

U.S. PATENT DOCUMENTS 5,208,204 A * 5/1993 Subramanian ........... B01J 23/63
502/313
5,494,878 A * 2/1996 Murakami ........... B01J 37/0244
502/328

(Continued)

FOREIGN PATENT DOCUMENTS

CN 101249437 A 8/2008
WO 2008097702 A1 8/2008
WO 2020257220 A1 12/2020

*Primary Examiner* — Cam N. Nguyen
(74) *Attorney, Agent, or Firm* — Quinn IP Law

(57) ABSTRACT

A three-way catalyst for reduced palladium loading is provided. The catalyst includes an inert substrate and a palladium catalyst material coating the substrate. The palladium catalyst material includes a support material formed from one of 10% $CeO_2/Al_2O_3$, 20% $CeO_2$—$Al_2O_3$ (20CeAlOy), 30% $CeO_2$—$Al_2O_3$ (30CeAlOy), $Al_2O_3$, and $MOx$-$Al_2O_3$, wherein M is one of copper, iron, manganese, titanium, zirconium, magnesium, strontium, and barium. The palladium catalyst material includes a layer of $CeO_2$ material disposed upon the support material, wherein the layer of $CeO_2$ material is dispersed on a surface of the support material. The palladium catalyst material includes an active component including a layer of praseodymium oxide particles dispersed across the surface of the layer of $CeO_2$ material and a layer of palladium particles disposed upon and dispersed across the surface of the layer of $CeO_2$ material at locations each corresponding to a respective location of each of the praseodymium particles.

20 Claims, 5 Drawing Sheets

(51) Int. Cl.
*B01J 23/44* (2006.01)
*B01J 23/63* (2006.01)
*B01J 35/04* (2006.01)
*B01J 37/02* (2006.01)
*F01N 3/10* (2006.01)
*B01J 6/00* (2006.01)

(52) U.S. Cl.
CPC ....... *B01J 37/0201* (2013.01); *B01J 37/0215* (2013.01); *B01J 37/0236* (2013.01); *F01N 3/101* (2013.01); *F01N 2570/10* (2013.01); *F01N 2570/12* (2013.01); *F01N 2570/14* (2013.01)

(58) Field of Classification Search
CPC .......... B01J 37/0201; B01J 37/0215; B01J 37/0236; B01J 6/001; F01N 3/101
USPC ........... 502/304, 328–330, 332, 334, 339, 502/349–351, 355, 415, 439
See application file for complete search history.

(56) References Cited

U.S. PATENT DOCUMENTS

| | | | | |
|---|---|---|---|---|
| 5,597,771 | A * | 1/1997 | Hu | B01J 23/63 502/333 |
| 5,672,557 | A * | 9/1997 | Williamson | B01J 23/63 502/355 |
| 8,465,711 | B2 * | 6/2013 | Ikeda | B01J 21/04 502/355 |
| 9,011,784 | B2 * | 4/2015 | Golden | C04B 35/486 422/177 |
| 9,012,353 | B2 * | 4/2015 | Golden | B01D 53/945 502/328 |
| 9,266,064 | B2 * | 2/2016 | Weigert | B01J 35/04 |
| 9,314,773 | B2 * | 4/2016 | Wakabayashi | B01D 53/944 |
| 9,339,793 | B2 * | 5/2016 | Ando | B01J 35/006 |
| 9,409,152 | B2 * | 8/2016 | Kumatani | B01J 35/023 |
| 9,486,793 | B2 * | 11/2016 | Klingmann | B01J 23/63 |
| 9,517,462 | B2 * | 12/2016 | Roesch | B01J 23/63 |
| 9,522,360 | B2 * | 12/2016 | Schmidt | F01N 3/0864 |
| 9,694,349 | B2 * | 7/2017 | Weigert | B01J 37/0248 |
| 9,707,545 | B2 * | 7/2017 | Felix | B01J 23/8946 |
| 10,625,243 | B2 * | 4/2020 | Clowes | B01J 35/04 |
| 10,857,520 | B2 * | 12/2020 | Takahashi | B01D 53/94 |
| 11,130,117 | B2 * | 9/2021 | Gu | B01J 23/63 |
| 11,179,701 | B2 * | 11/2021 | Sakurada | B01D 53/94 |
| 11,253,840 | B2 * | 2/2022 | Kobayashi | B01J 23/464 |
| 11,484,864 | B2 * | 11/2022 | Hara | B01J 37/088 |
| 2013/0336864 | A1 * | 12/2013 | Zheng | B01J 23/63 502/415 |
| 2018/0071679 | A1 * | 3/2018 | Karpov | B01J 21/06 |
| 2019/0111389 | A1 * | 4/2019 | Camm | B01J 23/10 |
| 2021/0053033 | A1 | 2/2021 | Qi et al. | |
| 2022/0055021 | A1 | 2/2022 | Liu et al. | |
| 2022/0193639 | A1 * | 6/2022 | Vjunov | B01J 37/0244 |
| 2022/0203339 | A1 * | 6/2022 | Zheng | B01J 23/46 |
| 2022/0212173 | A1 * | 7/2022 | Kimura | B01J 21/04 |
| 2022/0401926 | A1 * | 12/2022 | Zheng | B01J 35/006 |

* cited by examiner

THREE-WAY CATALYST WITH REDUCED PALLADIUM LOADING AND METHOD OF MAKING THE THREE-WAY CATALYST

GOVERNMENT CONTRACT

This application was made with government support under contract no. DE-EE0009196 awarded by the Department of Energy. The government has certain rights in the invention.

INTRODUCTION

The disclosure generally relates to a three-way catalyst with reduced palladium loading and a method of making the three-way catalyst.

An exhaust aftertreatment system is utilized to treat an exhaust gas flow, for example, generated by operation of an internal combustion engine. An exhaust gas flow may be defined as a flow of untreated exhaust gas including byproducts of combustion of hydrocarbon-containing fuel and oxygen, the flow emanating from the internal combustion engine. These byproducts may include hydrocarbons (HC), carbon monoxide (CO), and nitrogen oxides ($NO_x$). An exhaust aftertreatment system may include a catalytic converter device including a three-way catalyst. A three-way catalyst is a device or structure within the catalytic converter device that provides one or more surfaces treated with a coating that includes at least one catalyst. A catalyst is a material that facilitates rapid reaction of components of an untreated exhaust gas flow into components of a treated exhaust gas flow. In particular, a catalyst is a material that increases a rate of a chemical reaction without itself undergoing any permanent change. In one example, the three-way catalyst may facilitate rapid reaction of $NO_x$, HC, and CO in an untreated exhaust gas flow into nitrogen gas ($N_2$), water, and carbon dioxide ($CO_2$) in a treated exhaust gas flow. A three-way catalyst may be defined as a device that oxidizes HC and CO and reduces $NO_x$, with a resulting treated exhaust gas flow including water, $N_2$, and $CO_2$.

SUMMARY

A three-way catalyst for reduced palladium loading is provided. The three-way catalyst includes an inert substrate and a palladium catalyst material coating the inert substrate. The palladium catalyst material includes a support material formed from a material selected from the group consisting of 10% $CeO_2/Al_2O_3$, 20% $CeO_2$—$Al_2O_3$ (20CeAlOy), 30% $CeO_2$—$Al_2O_3$ (30CeAlOy), $Al_2O_3$, and $MO_x$—$Al_2O_3$, wherein M is a metal including at least one of copper, iron, manganese, titanium, zirconium, magnesium, strontium, and barium. As used herein, the term "$O_x$" is understood to mean an oxide(s). The palladium catalyst material further includes a layer of $CeO_2$ material disposed upon the support material and having a surface, wherein the layer of $CeO_2$ material is dispersed on the surface of the support material. The palladium catalyst material further includes an active component. The active component includes a first layer of praseodymium oxide particles disposed upon and dispersed across the surface of the layer of $CeO_2$ material and a second layer of a plurality of palladium particles disposed upon and dispersed across the surface of the layer of $CeO_2$ material at a plurality of locations each corresponding to a respective location of each of the plurality of praseodymium particles.

In some embodiments, the layer of $CeO_2$ material is a base layer of $CeO_2$. The surface of the layer of $CeO_2$ material is a first surface. The base layer of $CeO_2$ includes a plurality of $CeO_2$ nanostructures projecting upwardly from the first surface and each having a second surface. The first layer of praseodymium particles is disposed upon and dispersed across the second surface of each of the plurality of $CeO_2$ nanostructures. The second layer of a plurality of palladium particles is disposed upon and dispersed across the second surface of each of the plurality of $CeO_2$ nanostructures.

In some embodiments, the support material is 10% $CeO_2/Al_2O_3$ (10CA), which was formed by impregnating Ce nitrate onto $Al_2O_3$ and a subsequent calcination at a temperature of from 500° C. to 1050° C. for one to five hours.

In some embodiments, the support material is 10% $CeO_2/Al_2O_3$ (10CA), which was created by Ce nitrate impregnation onto $Al_2O_3$ and a subsequent calcination at a temperature of 950° C. for two hours.

In some embodiments, the support material is 10% $CeO_2/Al_2O_3$ (10 CeAlO$_y$) which was created by Ce nitrate impregnation onto $Al(OH)_x$ and a subsequent calcination at a temperature of 550° C. for two hours. As used herein, the term "$(OH)_x$" is understood to mean a hydroxide(s).

In some embodiments, the support material is 30CeAlOy.

In some embodiments, the support material is calcined at a temperature of from 500° C. to 1050° C. for two hours In some embodiments, the support material is 30CeAlOy calcined at a temperature of 950° C. for two hours.

In some embodiments, the support material is $MO_x$—$Al_2O_3$.

In some embodiments, the support material is calcined at a temperature of 550° C. for two hours.

In some embodiments, the active component is zPd-$\delta Ce_n Pr_{1-n} O_x$, wherein z is from 0.1 to 1.5, $\delta$ is from 5.0 to 40, and n is from 0.70 to 0.95.

In some embodiments, the active component is selected from the group consisting of 0.8Pd-20$Ce_{0.90}Pr_{0.10}O_x$ and 0.8Pd-30$Ce_{0.90}Pr_{0.10}O_x$.

In some embodiments, the second layer of the plurality of palladium particles is formed from single atoms of palladium.

According to one alternative embodiment, a device is provided. The device includes an internal combustion engine configured for producing an untreated exhaust gas flow and a catalytic converter including a three-way catalyst. The three-way catalyst facilitates chemical reactions to transform the untreated exhaust gas flow into a treated exhaust gas flow. The three-way catalyst includes an inert substrate and a palladium catalyst material coating the inert substrate. The palladium catalyst material includes a support material is a material selected from the group consisting of 10% $CeO_2/Al_2O_3$, 20% $CeO_2$—$Al_2O_3$ (20CeAlOy), 30% $CeO_2$—$Al_2O_3$ (30CeAlOy), $Al_2O_3$, and $MO_x$—$Al_2O_3$, wherein M is a metal and includes at least one of copper, iron, manganese, titanium, zirconium, magnesium, strontium, and barium. The palladium catalyst material further includes a layer of $CeO_2$ material disposed upon the support material and having a surface, wherein the layer of $CeO_2$ material is dispersed on the surface of the support material, and an active component. The active component includes a first layer of praseodymium oxide particles disposed upon and dispersed across the surface of the layer of $CeO_2$ material and a second layer of a plurality of palladium particles disposed upon and dispersed across the surface of the layer of $CeO_2$ material at a plurality of locations each corresponding to a respective location of each of the plurality of praseodymium particles.

In some embodiments, the active component is zPd-δCe$_n$Pr$_{1-n}$O$_x$, wherein z is from 0.1 to 1.5, δ is from 5.0 to 40, and n is from 0.70 to 0.95.

In some embodiments, the active component is 0.8Pd-20Ce$_{0.90}$Pr$_{0.10}$O$_x$.

In some embodiments, the active component is 0.8Pd-30Ce$_{0.90}$Pr$_{0.10}$O$_x$.

In some embodiments, the second layer of the plurality of palladium particles is formed from single atoms of palladium.

A method of making a three-way catalyst is provided. The method includes creating a palladium catalyst material. Creating the palladium catalyst includes selecting a support material in the form of a powder formed from a material selected from the group consisting of 10% CeO$_2$/Al$_2$O$_3$, 20% CeO$_2$—Al$_2$O$_3$ (20CeAlOy), 30% CeO$_2$—Al$_2$O$_3$ (30CeAlO$_y$), Al$_2$O$_3$, and MO$_x$—Al$_2$O$_3$, wherein M is a metal and includes at least one of copper, iron, manganese, titanium, zirconium, magnesium, strontium, and barium. Creating the palladium catalyst further includes providing a layer of Ce-containing material upon a surface of the support material to form a workpiece and calcining the workpiece. Creating the palladium catalyst further includes providing a layer of CeO$_2$ upon the surface of the support and the layer of Ce-containing material to form a precursor, the layer of CeO$_2$ having a first surface and calcining the precursor to form a calcined precursor. Creating the palladium catalyst further includes disposing a liquid co-impregnation composition upon the calcined precursor to form a product, wherein the liquid co-impregnation composition includes CeO$_2$, praseodymium, and palladium, and calcining the product to create a plurality of CeO$_2$ structures projecting upwardly from the first surface and an active component upon the product. Each of the plurality of CeO$_2$ structures has a second surface. The active component includes a first layer of praseodymium particles disposed upon and dispersed across the second surface of each of the plurality of CeO$_2$ nanostructures and a second layer of a plurality of palladium particles disposed upon and dispersed across the second surface of each of the plurality of CeO$_2$ nanostructures at a plurality of locations each corresponding to a respective location of each of the plurality of praseodymium particles. The method further includes creating a slurry with the palladium catalyst material, coating an inert substrate of the three-way catalyst with the slurry, and drying the slurry upon the inert substrate.

In some embodiments, the active component is zPd-δCe$_n$Pr$_{1-n}$O$_x$, wherein z is from 0.1 to 1.5, δ is from 5.0 to 40, and n is from 0.70 to 0.95.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 4 schematically illustrates a first operation which may be described as an incipient-wetness impregnation (IWI) operation;

FIG. 5 schematically illustrates a second operation which may be described as a second incipient-wetness impregnation operation;

FIG. 6 schematically illustrates a third operation wherein calcination is performed, resulting in the evaporation of remnants of the liquid co-impregnation composition of FIG. 5;

DETAILED DESCRIPTION

Figure 1:
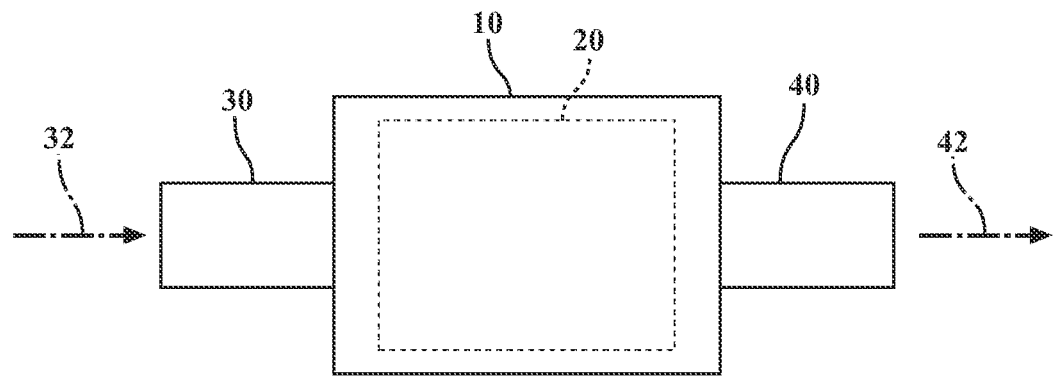
FIG. 1 schematically illustrates an exemplary catalytic converter device including a three-way catalyst configured for providing exhaust aftertreatment to an untreated exhaust gas flow, in accordance with the present disclosure.

Exhaust gas aftertreatment systems receive an untreated exhaust gas flow from a device or system such as an internal combustion engine. A temperature of the untreated exhaust gas flow may vary, based upon factors such as an output torque provided by the device or system and an ambient temperature. Catalysts within a catalytic converter device may be sensitive to high temperatures. With high temperatures, a catalyst may be expended, deactivated, or may have its effectiveness reduced due to sintering.

A three-way catalyst may include a catalytic monolithic structure or a honeycombed catalytic cake structure within the three-way catalyst. The catalytic monolithic structure includes a plurality of holes defining flow paths through the catalytic monolithic structure. Within the flow paths, a large surface of the catalytic monolithic structure is coated or covered with catalyst particles or a catalyst material. This coating may be applied as a washcoat, which may be described as a liquid or slurry material including solid particles being used to deposit the solid particles over the surface if a monolithic structure or support structure. An untreated exhaust gas flow is directed through these flow paths. Within the flow paths, chemical components of the untreated exhaust gas flow such as carbon monoxide, hydrocarbons and NO$_x$ come into contact with the catalyst material and are transformed through chemical reactions into compounds such as carbon dioxide, water and nitrogen gas. After these chemical reactions take place, the untreated exhaust gas flow becomes a treated exhaust gas flow. Palladium (Pd) is one catalyst that may be utilized as a catalyst material within a three-way catalyst.

Pd is rare and expensive. Reducing an amount of Pd that is used within a three-way catalyst and reducing a frequency that the three-way catalyst must be replaced (collectively described as a reduced Pd loading) are beneficial. A three-way catalyst with reduced Pd loading and a method for making the same are provided. The three-way catalyst may include an inert substrate, for example, creating a honeycombed cake material, and that inert substrate may be coated with a Pd catalyst material.

The Pd catalyst material may initially be formed as a powder which is then used to create a slurry or washcoat to coat the inert substrate of the three-way catalyst. This powder may be created including a stabilizing support material in powder form which may include a defect-rich $CeO_2$, $Pr_6O_{11}$, and $Al_2O_3$ oxide composite. Defects upon a surface of the powder are useful to creating locations upon the surface that attract and act as binding agents to Pd particles. A support material may be described as an inert material upon which an active component may be deposited. The stabilizing support material may be selected or enhanced for excellent hydrophilic properties of the surface of the support material. Upon the support material, Pd particles or single Pd atoms may be widely dispersed or widely and evenly distributed as a main active component. In one embodiment, a nanosized Pd-CePrOx active component (with Pd present as dispersed single atoms or with small, dispersed clusters of Pd in a fresh catalyst state) may be utilized upon an $Al_2O_3$ support with excellent or enhanced hydrophilic properties. As a result, the Pd catalyst material includes the stabilizing support material with widely or up to 100% dispersed Pd particles upon the surface of the stabilizing support material. In one exemplary embodiment, the stabilizing support structure includes the $Al_2O_3$ support with a layer of Ce-based material coating the $Al_2O_3$ support, such that the Pd particles dispersed over the surface are separated from the $Al_2O_3$ support by the layer of Ce material. The Pd catalyst material may be provided upon the surfaces of the catalytic monolithic structure, for example, with the powder being used to create a slurry that is wash-coated upon the surfaces of the catalytic monolithic structure. The resulting three-way catalyst configuration coated with the disclosed Pd catalyst material shows excellent resistance to aging and matched performance or activity of a baseline $Pd/Al_2O_3$ equipped three-way catalyst while using only 40% of the Pd used by the baseline three-way catalyst. Deactivation of Pd upon a three-way catalyst may be alleviated or balanced by the widely dispersing Pd nanoclusters or single atom Pd on a Pr-modified $CeO_2/Al_2O_3$ mixed oxide.

The Pd catalyst material exhibits a layered structure, with a support material covered by small $CeO_2$ particles. These $CeO_2$ particles exhibit high defect density due to praseodymium (Pr) doping. This stabilizing support material including the high defect density enables wide dispersion of Pd single atoms during a wet-impregnation process and may avoid sintering under various operating conditions.

The Pd catalyst material may include a layered support structure including Ce-containing particles or $CeO_2$ particles on an external surface. During formation upon the surface, the Ce-containing particles form crystals. A surface of a crystal formed with Ce material may be smooth and without defects. Pd particles are attracted to and form bonds with defects upon the surface, and if the surface has too few defects, not enough of the Pd particles may attach to the surface for the catalyst to be effective. By increasing a number or occurrence of defects upon the surface of the Ce material, Pd particles may be attracted to and widely dispersed upon the surface of the layered support structure.

The Pd catalyst material may include a high or selected defect density due to calibrated Pr doping or forming a surface including widely dispersed Pr particles. This defect density may be further increased by three-dimensional $CeO_2$ nanostructures projecting upwardly from the surface of the material, increasing an overall surface area of the surface, and/or by reducing Ce crystal size to increase a density of boundaries between neighboring Ce crystals. The resulting selected defect density may be used to control and create excellent Pd single atom dispersion upon the three-way catalyst. This excellent dispersion of the Pd results in excellent aging resistance in the Pd upon the three-way catalyst.

A method of creating the Pd catalyst material to be utilized upon a three-way catalyst may be described as utilizing co-impregnation of Pd, Pr, and Ce material upon a support structure. The method may further include utilizing a selected palladium/cerium (Pd/Ce) ratio and a selected praseodymium/cerium (Pr/Ce) ratio.

A variety of support materials may be utilized to form the Pd catalyst material in order to provide excellent hydrophilic properties. A first embodiment of the support material may include 10CA, which may be described as 10% $CeO_2/Al_2O_3$ (10% $CeO_2/Al_2O_3$ from Ce nitrate impregnation onto $Al_2O_3$, calcined at 950° C. for 2 hours). A second embodiment of the support material may include $10CeAlO_y$, which may be described as 10% $CeO_2/Al_2O_3$ (10% $CeO_2/Al_2O_3$ from Ce nitrate impregnation onto $Al(OH)_x$, calcined at 550° C. for 2 hours). A third embodiment of the support material may include $30CeAlO_y$, which may be described as 30% $CeO_2$—$Al_2O_3$. A fourth embodiment of the support material may include $30CeAlO_y$-950, which may be described as 30% $CeO_2$—$Al_2O_3$, calcined at 950° C. for 2 hours. A fifth embodiment of the support material may include $Al_2O_3$-HD, which may be described as $Al_2O_3$ with high density. A sixth embodiment of the support material may include $MO_x$—$Al_2O_3$, which may be described as a commercial mixed oxide material or M salt impregnation onto $Al_2O_3$ followed by calcination at 550° C. for 2 hours. M may be a metal and may include copper, iron, manganese, titanium, zirconium, magnesium, strontium, barium and so on. The $Al_2O_3$ support material 110 may include any of these support materials.

A three-way catalyst for reduced palladium loading is provided. The three-way catalyst includes an inert substrate and a palladium catalyst material coating the inert substrate. The palladium catalyst material includes a support material formed from a material selected from the group consisting of 10% $CeO_2/Al_2O_3$, 20% $CeO_2$—$Al_2O_3$ (20CeAlOy), 30% $CeO_2$—$Al_2O_3$ (30CeAlOy), $Al_2O_3$, and $MOx$-$Al_2O_3$, wherein M is a metal including at least one of copper, iron, manganese, titanium, zirconium, magnesium, strontium, barium and so on. The palladium catalyst material further includes a layer of $CeO_2$ material disposed upon or formed and located upon the support material and having a surface, wherein the layer of $CeO_2$ material is dispersed on the surface of the support material. The palladium catalyst material further includes an active component including a first layer of praseodymium oxide particles disposed upon and dispersed across the surface of the layer of $CeO_2$ material and a second layer of a plurality of palladium particles disposed upon and dispersed across the surface of the layer of $CeO_2$ material at a plurality of locations each corresponding to a respective location of each of the plurality of praseodymium particles.

The layer of $CeO_2$ material may be a base layer of $CeO_2$. The surface of the layer of $CeO_2$ material may be a first surface. The base layer of $CeO_2$ may include a plurality of $CeO_2$ nanostructures projecting upwardly from the first surface and each having a second surface. The first layer of praseodymium particles may be disposed upon and dispersed across the second surface of each of the plurality of $CeO_2$ nanostructures. The second layer of a plurality of palladium particles is disposed upon and dispersed across the second surface of each of the plurality of $CeO_2$ nanostructures.

The support material may be 10% $CeO_2/Al_2O_3$ (10CA), which was formed by impregnating Ce nitrate onto $Al_2O_3$ and a subsequent calcination at a temperature of from 500° C. to 1050° C. for from one hour to five hours.

The support material may be 10% $CeO_2/Al_2O_3$ (10CA), which was created by Ce nitrate impregnation onto $Al_2O_3$ and a subsequent calcination at a temperature of 950° C. for two hours.

The support material may be 10% $CeO_2/Al_2O_3$ (10CeAlO$_y$) which was created by Ce nitrate impregnation onto $Al(OH)_x$ and a subsequent calcination at a temperature of 550° C. for two hours.

The support material may be 30CeAlO$_y$.

The support material may be calcined at a temperature of from 500° C. to 1050° C. for two hours.

The support material may be 30CeAlO$_y$, calcined at a temperature of 950° C. for two hours.

The support material may be $MO_x$—$Al_2O_3$.

The support material may be calcined at a temperature of 550° C. for two hours.

The active component may be $zPd\text{-}\delta Ce_n Pr_{1-n}O_x$, wherein z is from 0.1 to 1.5, δ is from 5 to 40, and n is from 0.70 to 0.95. In particular, z may be expressed in parts by weight loading of Pd based on 100 parts by weight of the active component, δ may be expressed in parts by weight based on 100 parts by weight of the active component, and n may be expressed as a molar ratio.

The active component may be selected from the group consisting of $0.8Pd\text{-}20Ce_{0.90}Pr_{0.10}O_x$ and $0.8Pd\text{-}30Ce_{0.90}Pr_{0.10}O_x$.

The second layer of the plurality of palladium particles may be formed from single atoms of palladium.

A device is provided. The device may include a vehicle. The device includes an internal combustion engine configured for producing an untreated exhaust gas flow and a catalytic converter including a three-way catalyst. The three-way catalyst facilitates chemical reactions to transform the untreated exhaust gas flow into a treated exhaust gas flow. The three-way catalyst includes an inert substrate and a palladium catalyst material coating the inert substrate. The palladium catalyst material includes a support material formed from a material selected from the group consisting of 10% $CeO_2/Al_2O_3$, 20% $CeO_2$—$Al_2O_3$ (20CeAlOy), 30% $CeO_2$—$Al_2O_3$ (30CeAlOy), $Al_2O_3$, and $MO_x$—$Al_2O_3$, wherein M is a metal and includes at least one of copper, iron, manganese, titanium, zirconium, magnesium, strontium, and barium. The palladium catalyst material further includes a layer of $CeO_2$ material disposed upon the support material and having a surface, wherein the layer of $CeO_2$ material is dispersed on the surface of the support material. The palladium catalyst material further includes an active component. The active component includes a first layer of praseodymium oxide particles disposed upon and dispersed across the surface of the layer of $CeO_2$ material and a second layer of a plurality of palladium particles disposed upon and dispersed across the surface of the layer of $CeO_2$ material at a plurality of locations each corresponding to a respective location of each of the plurality of praseodymium particles.

The active component may be $zPd\text{-}\delta Ce_n Pr_{1-n}O_x$, wherein z is from 0.1 to 1.5, δ is from 5 to 40, and n is from 0.70 to 0.95.

The active component may be $0.8Pd\text{-}20Ce_{0.90}Pr_{0.10}O_x$.

The active component may be $0.8Pd\text{-}30Ce_{0.90}Pr_{0.10}O_x$.

The second layer of the plurality of palladium particles may be formed from single atoms of palladium.

Referring now to the drawings, wherein like reference numbers refer to like features throughout the several views, FIG. 1 schematically illustrates an exemplary catalytic converter device 10 including a three-way catalyst 20 providing exhaust aftertreatment to an untreated exhaust gas flow 32. The three-way catalyst 20 includes the disclosed Pd catalyst material including Pd single atom dispersion. The catalytic converter device 10 includes an inlet 30 and an outlet 40. Each of the inlet 30 and the outlet 40 are connected to exhaust aftertreatment system components such as pipes configured for moving exhaust gas from one device to a second device. Untreated exhaust gas flow 32 is illustrated entering the inlet 30. Treated exhaust gas flow 42 is illustrated exiting the outlet 40.

Figure 2:
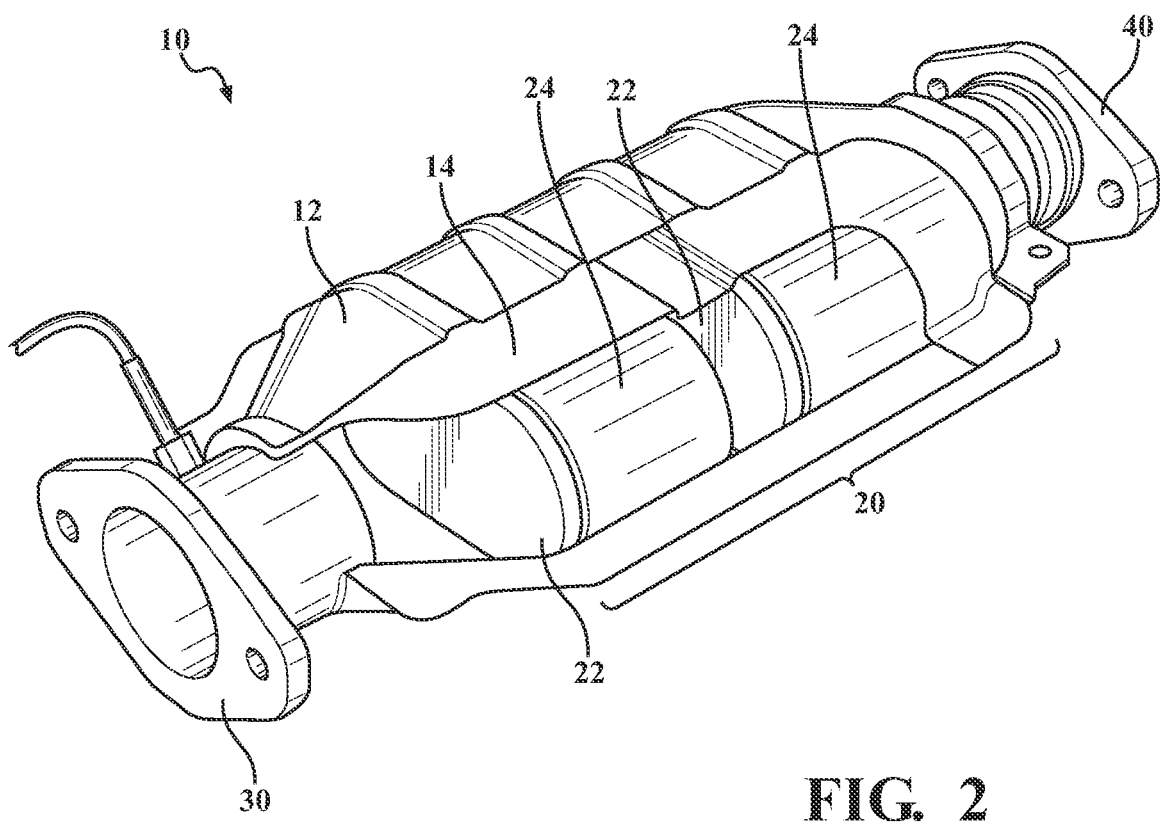
FIG. 2 schematically illustrates in cross-sectional perspective view one embodiment of the catalytic converter device of FIG. 1, in accordance with the present disclosure.

FIG. 2 schematically illustrates in cross-sectional perspective view one embodiment of the catalytic converter device 10 of FIG. 1. The catalytic converter device 10 includes a three-way catalyst 20, which is embodied as two catalytic monolithic structures 22. Each of the catalytic monolithic structure 22 may include a plurality of holes defining flow paths through the catalytic monolithic structure 22. Surfaces of the catalytic monolithic structure 22 including the surfaces of the flow paths interior to the catalytic monolithic structure 22 may be coated with the disclosed Pd catalyst material. Each of the catalytic monolithic structures 22 may include an annular gasket 24 surrounding the catalytic monolithic structures 22. The catalytic converter device 10 is further illustrated including a first layer 14 of metal heat shield housings and a second layer 12 of metal heat shield housings. The catalytic converter device 10 is further illustrated including the inlet 30 and the outlet 40.

Figure 3:
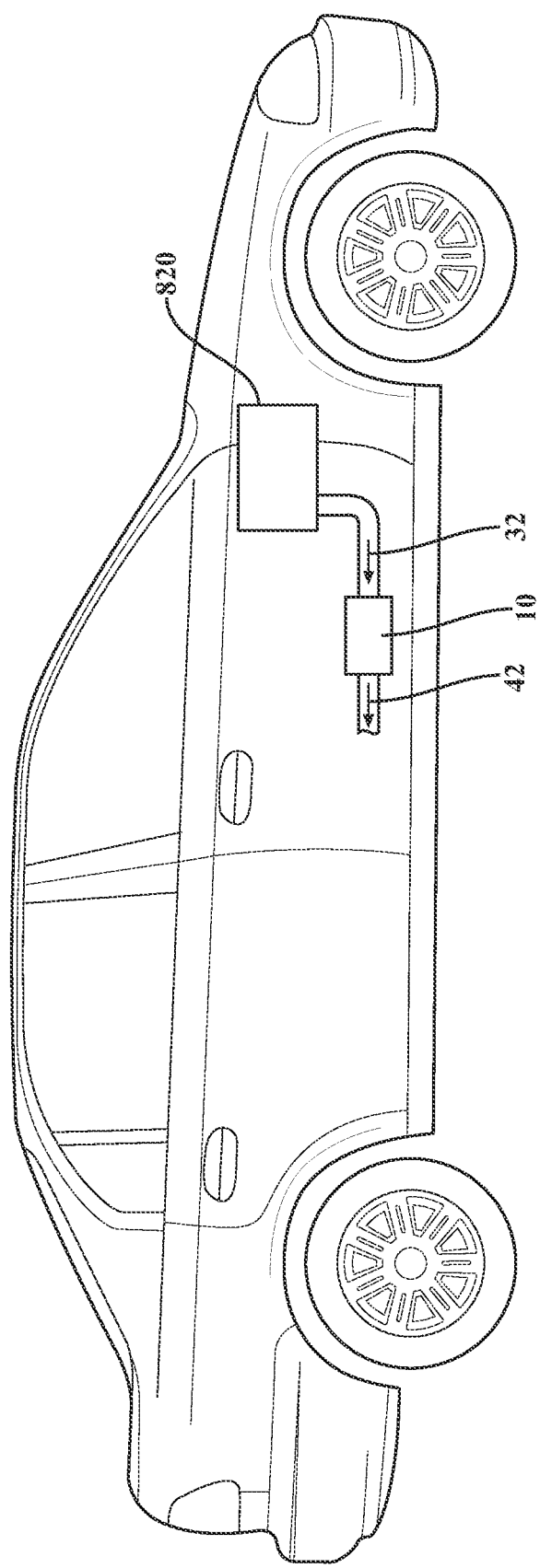
FIG. 3 schematically illustrates a device including a catalytic converter configured for providing exhaust aftertreatment to an exhaust gas flow generated by an internal combustion engine, in accordance with the present disclosure.

FIG. 3 schematically illustrates a device 800 including an internal combustion engine 820 and the catalytic converter device 10. The device 800 is embodied as a vehicle. The engine 820 is connected to the three-way catalyst 20 (FIG. 2) with a pipe or conduit configured for transporting high temperature exhaust gas. Untreated exhaust gas flow 32 is illustrated entering the catalytic converter device 10. As a result of the operation of the three-way catalyst 20 disclosed herein within the catalytic converter device 10, a treated exhaust gas flow 42 is illustrated exiting the catalytic converter device 10. A pipe or conduit exiting the catalytic converter device 10 may connected to other exhaust aftertreatment devices or structures, such as a muffler device and a tailpipe.

Figure 4:
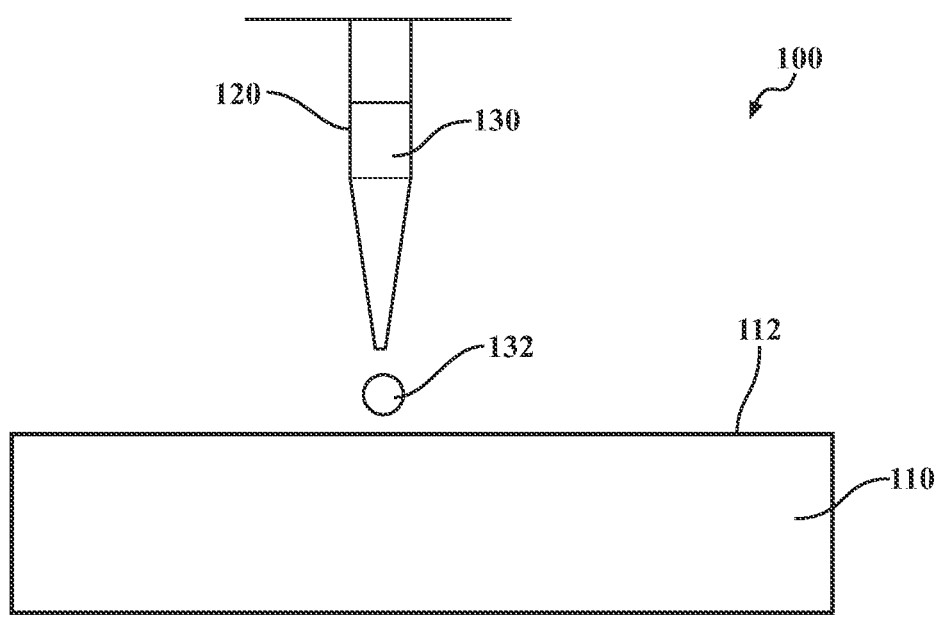
FIGS. 4-6 illustrate an exemplary sequence of manufacturing operations for forming the three-way catalyst of FIG. 1, in accordance with the present disclosure.
Figure 5:
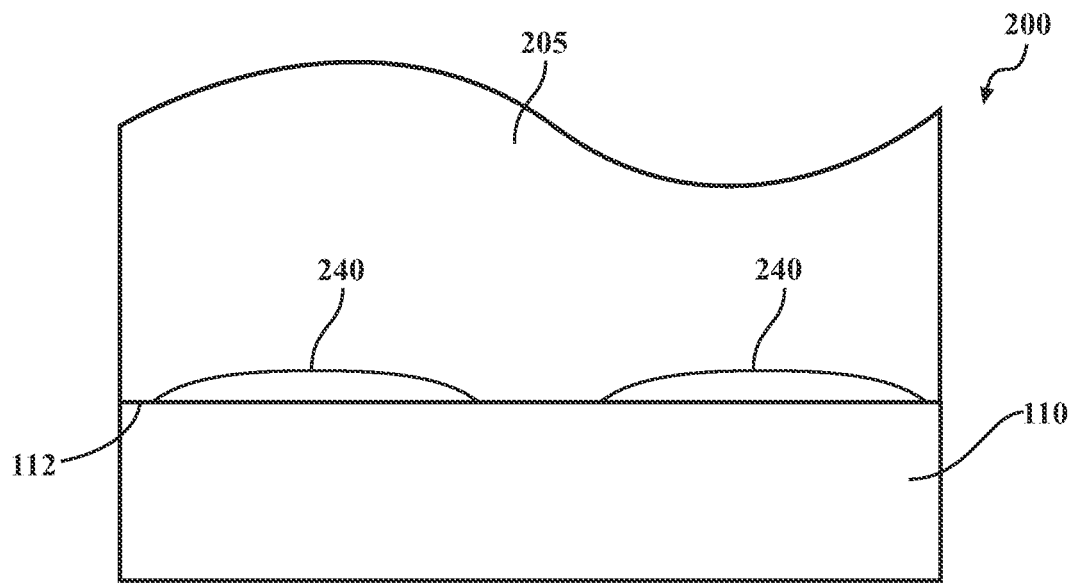

FIGS. 4 and 5 illustrate an exemplary sequence of manufacturing operation steps to create the Pd catalyst material used to coat the three-way catalyst 20 of FIG. 1. FIG. 4 schematically illustrates operation 100 which may be described as an incipient-wetness impregnation (IWI) operation, wherein an $Al_2O_3$ support material 110 is provided. The $Al_2O_3$ support material 110 may be in powder form, and the flat appearance of the $Al_2O_3$ support material 110 in FIGS. 4-7 may be simplified for purposes of illustration and/or a result of substantial magnification of the $Al_2O_3$ support material 110. The $Al_2O_3$ support material 110 includes a surface 112. A dispensing nozzle 120 is provided, including a supply 130 of a Ce-containing solution. In one exemplary embodiment, the Ce-containing solution may include 10% by weight $Ce(NO_3)_3$ solution. A droplet 132 of the Ce-containing solution is illustrated being deposited upon the surface 112 of the $Al_2O_3$ support material 110. A plurality of droplets 132 are deposited upon the surface 112 until a selected amount of the Ce-containing solution is disposed upon the surface 112. Once the selected amount of the Ce-containing solution is deposited upon the surface 112, a heated calcination process is applied to the $Al_2O_3$ support material 110. In one embodiment, the calcination process is performed at 950° C. In another embodiment, the calcination process is performed within a temperature range of from 500° C. to 1050° C. The calcination process, particularly within a relatively higher portion of the defined range, such as at 950° C. or at least in excess of a 795° C. melting point of Ce, may be particularly useful, as the Ce within the provided solution may be melted to a liquid state and may spread across and coat most or an entirety of the $Al_2O_3$ support material 110 prior to the Ce later cooling and solidifying. As a result of operation 100, a solvent of the Ce-containing solution is evaporated and a layer of Ce-containing compound is dried upon the surface 112.

FIG. 5 schematically illustrates operation 200 which may be described as a co-impregnation process. The $Al_2O_3$ support material 110 is illustrated including a layer of Ce-containing compound 240 dried upon the surface 112 as a result of operation 100 of FIG. 2. The Ce-containing compound 240 may cover most of the surface 112 or may cover an entirety of the surface 112. In operation 200, a liquid co-impregnation composition 205 is applied to the $Al_2O_3$ support material 110 and the Ce-containing compound 240. In one embodiment, the liquid co-impregnation composition 205 may include $Pd(NO_3)_2$, $Pr(NO_3)_3$, and a Ce-containing liquid. The Ce-containing liquid may include colloidal $CeO_2$ or cerium nitrate ($Ce(NO_3)_3$). Operation 200 may include calcination at a relatively lower temperature as compared to operation 100, for example, including calcination at 500° C., resulting in the evaporation of liquid components of the liquid co-impregnation composition 205 of FIG. 5.

As a result of the co-impregnation process and subsequent calcination of operation 200, additional newly deposited Ce-containing materials are disposed upon the Ce-containing compound 240 in the form of a plurality of Ce crystals. Wherein the liquid co-impregnation composition 205 includes cerium nitrate, a resulting surface of the deposited Ce-containing materials may be relatively flat or may conform to a shaped of the $Al_2O_3$ support material 110 beneath the deposited Ce material. Wherein the liquid co-impregnation composition 205 includes colloidal $CeO_2$, a resulting surface of the deposited Ce-containing materials may include three-dimensional features which may be described as $CeO_2$ nanostructures projecting upwardly from the surface. Additionally, Pr particles are dispersed throughout the newly deposited Ce-containing materials. Boundaries between the Ce crystals of the newly deposited Ce-containing materials may attract and create chemical bonds with Pd particles. Additionally, the Pr particles dispersed in the newly deposited Ce-containing materials may create defects in the surface of the Ce-containing materials and may attract and create chemical bonds with Pd particles. By controlling Ce crystal size and by controlling how much Pr is dispersed in the deposited Ce-containing materials, one may control how widely Pd particles or how efficiently Pd particles are dispersed across the surface of the deposited Ce-containing materials. In one embodiment, with enough defects created in the surface of the deposited Ce-containing materials, single atom Pd particles may be dispersed across the surface of the resulting Pd catalyst material.

Figure 6:
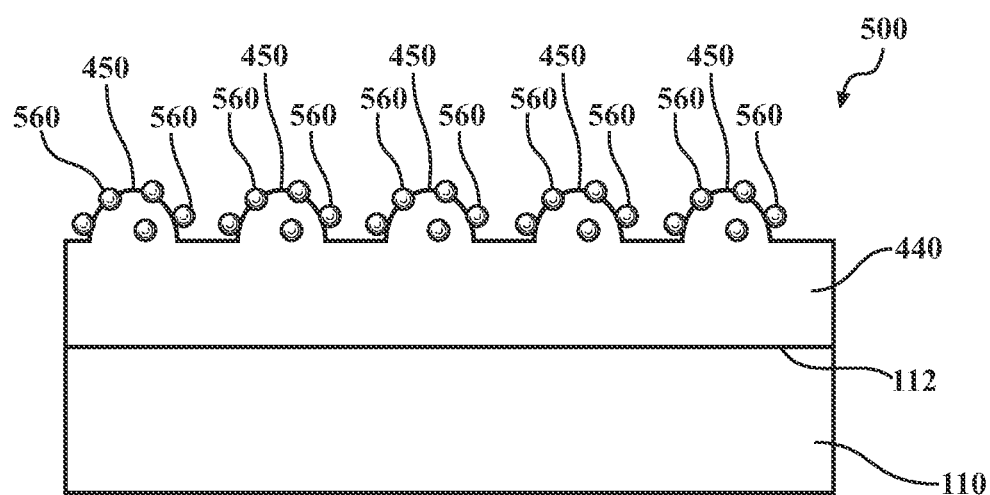

FIG. 6 schematically illustrates an embodiment of the Pd catalyst material 500 formed as a result of the operation 200 of FIG. 5, wherein the surface of the Pd catalyst material 500 includes $CeO_2$ nanostructures 450. The $Al_2O_3$ support material 110 is illustrated including the Ce materials 440 coating the surface 112. The $CeO_2$ nanostructures 450 are illustrated formed upon the Ce materials 440 consistent with the operation 200 of FIG. 5 having utilized the liquid co-impregnation composition 205 including colloidal $CeO_2$. Each of the $CeO_2$ nanostructures 450 includes a plurality of Pr particles dispersed within the $CeO_2$ material. Each of the $CeO_2$ nanostructures 450 is illustrated with a plurality of Pd particles 560 illustrated disposed upon the $CeO_2$ nanostructures 450 at locations corresponding to Pr particles upon the $CeO_2$ nanostructures 450. FIG. 6 is provided for illustration purposes and may not be drawn to scale, as Pd particles 560 may be single Pd atoms.

Figure 7:
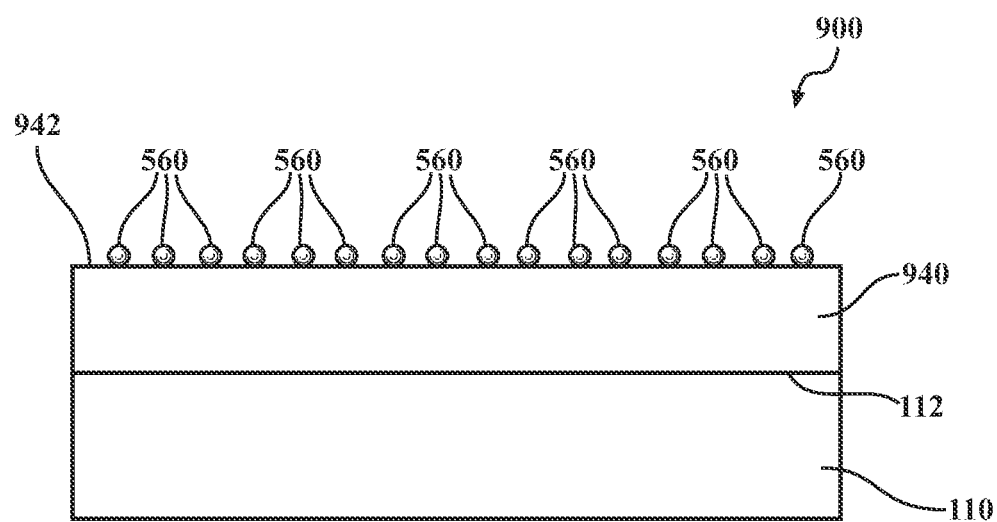
FIG. 7 schematically illustrates an alternative embodiment of the three-way catalyst of FIG. 1 including a layer of CeO$_2$ material uniformly dispersed on the surface of the support material, in accordance with the present disclosure.

FIG. 7 schematically illustrates an alternative embodiment of a Pd catalyst material 900 including a layer 940 of $CeO_2$ material uniformly dispersed on the surface 112 of the support material 110. The support material 110 is illustrated, including the layer 940 formed upon the surface 112. The layer 940 may include a relatively flat surface 942 consistent with the operation 200 of FIG. 5 having utilized the liquid co-impregnation composition 205 including cerium nitrate. The surface 942 includes Pr particles deposited and disposed over the surface 942. A plurality of Pd particles 560 are illustrated disposed over the surface 942 at locations corresponding to Pr particles disposed upon the surface 942. FIG. 7 is provided for illustration purposes and may not be drawn to scale, as Pd particles 560 may be single Pd atoms.

An active component coating including Pd may be dispersed upon the $Al_2O_3$ support material 110 of FIG. 4 after a drying or calcination process has been utilized, such that the coating is a dried layer upon the $Al_2O_3$ support material 110. A number of combinations of Pd and support materials are envisioned, resulting in a number of formulations for the Pd catalyst material. In a first embodiment of the Pd catalyst material, $0.8Pd-20Ce_nPr_{1-n}O_x/10CA$ may be described as a co-IWI of 0.8% by weight Pd and 20% $Ce_nPr_{1-n}O_x$ (n=1, 0.95, 0.9, 0.8, or 0.7) on a 10CA support, calcined at 550° C. for 2 hours. In a second embodiment of the Pd catalyst material, $0.8Pd-20Ce_{0.9}Pr_{0.1}O_x$ may be described as a co-IWI of 0.8% by weight Pd and 20% $Ce_{0.9}Pr_{0.1}O_x$, calcined at 550° C. for 2 hours, and may be utilized upon any of the following supports: $10CeAlO_y$, $30CeAlO_y$, $30CeAlO_y$-950, $Al_2O_3$-HD, and $MO_x$—$Al_2O_3$. In a third embodiment of the Pd catalyst material, $0.8Pd-30Ce_{0.9}Pr_{0.1}O_x$ may be described as a co-IWI of 0.8% by weight Pd and 30% $Ce_{0.9}Pr_{0.1}O_x$, calcined at 550° C. for 2 hours, and may be utilized upon either of the following supports: $Al_2O_3$-HD, and $MO_x$—$Al_2O_3$.

Figure 8:
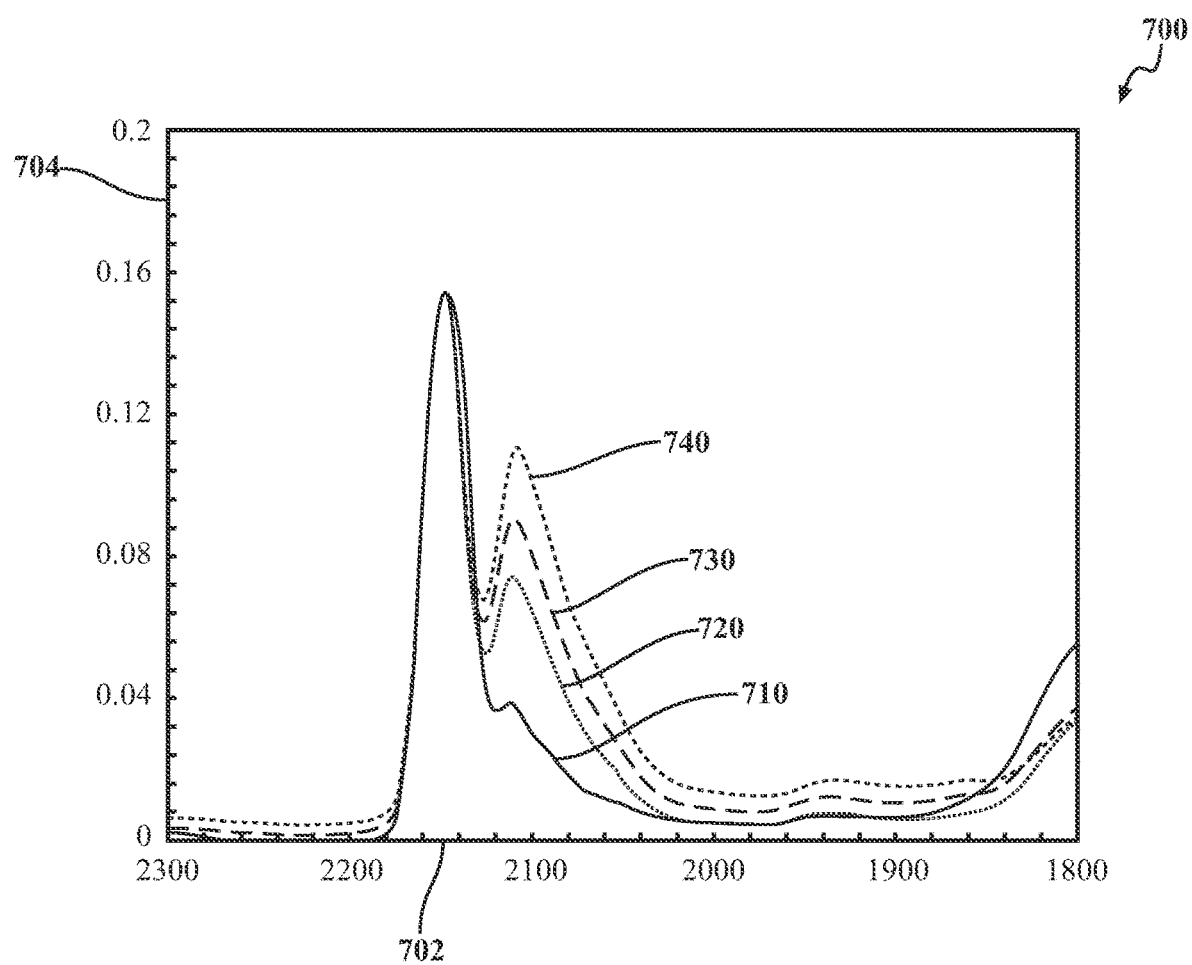
FIG. 8 is a graph illustrating infrared spectroscopy analysis of various three-way catalysts including different concentrations of palladium deposited upon the three-way catalysts, in accordance with the present disclosure.

FIG. 8 is a graph 700 illustrating infrared spectroscopy analysis of various three-way catalysts including different concentrations of Pd deposited upon the three-way catalysts according to the disclosed methods. A horizontal axis 702 illustrates a wave number (measured in $cm^{-1}$). A vertical axis 704 illustrates normalized absorbance (measured in arbitrary units (Au)). Plot 710 illustrates 0.2Pd (500° C. oxidized). Plot 720 illustrates 0.4Pd (500° C. oxidized). Plot 730 illustrates 0.6Pd (500° C. oxidized). Plot 740 illustrates 1.2Pd (500° C. oxidized). A wave number of 2144 $cm^{-1}$ corresponds to CO stretching on a Pd cation (a signature of single atom Pd species). A wave number of 2108 $cm^{-1}$ corresponds to CO stretching on a Pd cluster (a signature of sub nanometer Pd clusters). According to the disclosed methods, graph 700 illustrates that the use of colloidal $CeO_2$ precursor and Pr co-impregnation leads to formation of significantly smaller $CeO_2$ particles and high defect density thus minimizing large Pd particle formation.

Figure 9:
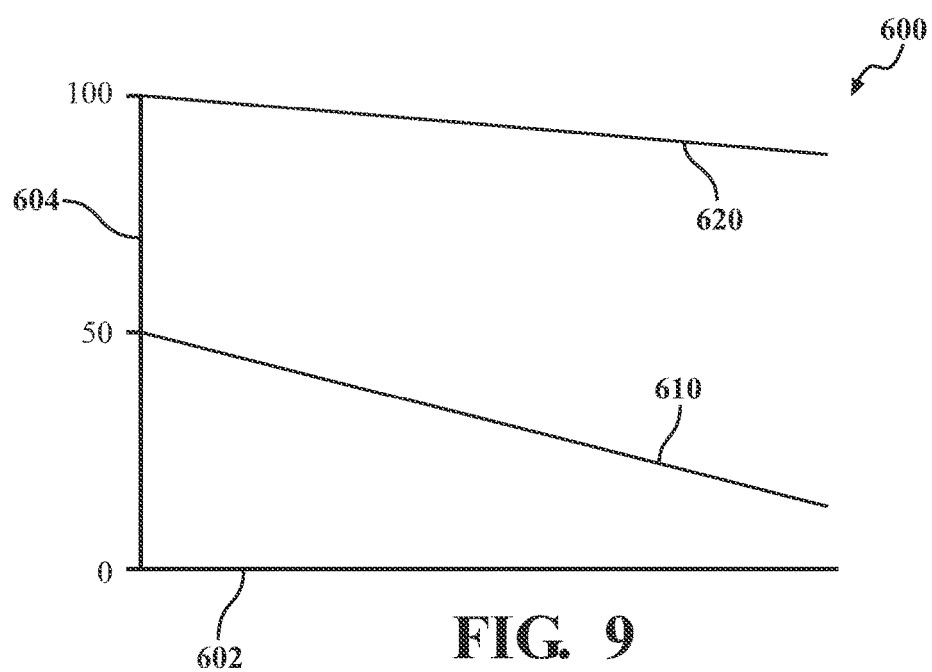
FIG. 9 is a graph illustrating deactivation of palladium particles upon a first three-way catalyst including a baseline palladium dispersion and upon a second three-way catalyst including palladium dispersion according to the disclosed methods, in accordance with the present disclosure.

FIG. 9 is a graph 600 illustrating deactivation of palladium particles upon a first three-way catalyst including a baseline palladium dispersion and upon a second three-way catalyst including palladium dispersion according to the disclosed methods. The graph 600 includes a horizontal axis 602 representing time that a three-way catalyst is in use. The graph 600 further includes a vertical axis 604 representing percent dispersion of activated Pd particles upon the three-way catalyst. Plot 610 represents a percent of activated Pd particles upon a three-way catalyst including baseline palladium dispersion over time, wherein the three-way catalyst is created without the benefit of the disclosed methods. The plot 610 begins with approximately 50% dispersion of activated Pd particles, representing a three-way catalyst including clumps or aggregate particles of Pd with a 3-5 nanometer average diameter or thickness. With the use of such aggregate particles of Pd, not all of the atoms of Pd are exposed and useful as a catalyst, and yet these particles are deactivated over time nonetheless. Further, the particles of Pd do not have the layer of Ce separating the particles of Pd from the supporting material such as $Al_2O_3$. As a result, the particles of Pd represented by the plot 610 are deactivated at a relatively rapid rate. Plot 620 represents a percent of activated Pd particles upon a three-way catalyst over time, therein the three-way catalyst is created according to the disclosed methods. Plot 620 starts at a left position, representing an initial state of the three-way catalyst, at 100% or near 100% dispersion, representing the Pd being dispersed over the surface of the three-way catalyst as single atom Pd particles. The wide dispersion of the single atom Pd particles and the layer of Ce-containing material separating the Pd particles from the supporting material enable the three-way catalyst represented by the plot 620 to resist deactivation of the Pd particles over time better than the three-way catalyst represented by the plot 610, resulting in a relatively slower deactivation rate of the Pd particles upon the three-way catalyst represented by the plot 620. As a result, the three-way catalyst represented by the plot 620, with the structures described herein and/or created according to the methods disclosed herein, starts with a higher dispersion percentage and suffers deactivation over time at a relatively lower rate as compared to the three-way catalyst represented by the plot 610. As a result, the three-way catalyst with the structures described herein and/or created according to the methods disclosed herein may include reduced Pd loading as compared to the three-way catalyst including the baseline palladium dispersion.

A method of making a three-way catalyst is provided. The method includes creating a palladium catalyst material. Creating the palladium catalyst material includes selecting a support material in the form of a powder formed from a material selected from the group consisting of 10% $CeO_2/Al_2O_3$, 20% $CeO_2$—$Al_2O_3$ (20CeAlOy), 30% $CeO_2$—$Al_2O_3$ (30CeAlO$_y$), $Al_2O_3$, and $MO_x$—$Al_2O_3$, wherein M is a metal and includes at least one of copper, iron, manganese, titanium, zirconium, magnesium, strontium, and barium. Creating the palladium catalyst material further includes providing a layer of Ce-containing material upon a surface of the support material to form a workpiece and calcining the workpiece. Creating the palladium catalyst material further includes providing a layer of $CeO_2$ upon the surface of the support and the layer of Ce-containing material to form a precursor, the layer of $CeO_2$ having a first surface, and calcining the precursor to form a calcined precursor. Creating the palladium catalyst material further includes disposing a liquid co-impregnation composition upon the calcined precursor to form a product, wherein the liquid co-impregnation composition includes $CeO_2$, praseodymium, and palladium, and calcining the product to create a plurality of $CeO_2$ structures projecting upwardly from the first surface and an active component upon the product. Each of the plurality of $CeO_2$ structures has a second surface. The active component includes a first layer of praseodymium particles disposed upon and dispersed across the second surface of each of the plurality of $CeO_2$ nanostructures and a second layer of a plurality of palladium particles disposed upon and dispersed across the second surface of each of the plurality of $CeO_2$ nanostructures at a plurality of locations each corresponding to a respective location of each of the plurality of praseodymium particles. The method further includes creating a slurry with the palladium catalyst material, coating an inert substrate of the three-way catalyst with the slurry, and drying the slurry upon the inert substrate.

The active component may be $zPd$-$\delta Ce_n Pr_{1-n} O_x$, wherein z is from 0.1 to 1.5, $\delta$ is from 5 to 40, and n is from 0.70 to 0.95.

The active component may be $0.8Pd$-$20Ce_{0.90}Pr_{0.10}O_x$.

The active component may be $0.8Pd$-$30Ce_{0.90}Pr_{0.10}O_x$.

While the best modes for carrying out the disclosure have been described in detail, those familiar with the art to which this disclosure relates will recognize various alternative designs and embodiments for practicing the disclosure within the scope of the appended claims.

What is claimed is:

1. A three-way catalyst for reduced palladium loading, the three-way catalyst comprising:
   an inert substrate; and
   a palladium catalyst material coating the inert substrate, the palladium catalyst material including:
      a support material formed from a material selected from the group consisting of 10% $CeO_2/Al_2O_3$, 20% $CeO_2$—$Al_2O_3$, 30% $CeO_2$—$Al_2O_3$, $Al_2O_3$, and $MO_x$—$Al_2O_3$, wherein M is a metal including at least one of copper, iron, manganese, titanium, zirconium, magnesium, strontium, and barium, and wherein $O_x$ is an oxide(s);
      a layer of $CeO_2$ material disposed upon the support material and having a surface, wherein the layer of $CeO_2$ material is dispersed on the surface of the support material; and
      an active component including:
         a first layer of praseodymium oxide particles disposed upon and dispersed across the surface of the layer of $CeO_2$ material; and
         a second layer of a plurality of palladium particles disposed upon and dispersed across the surface of the layer of $CeO_2$ material at a plurality of locations each corresponding to a respective location of each of the plurality of praseodymium particles.

2. The three-way catalyst of claim 1, wherein the layer of $CeO_2$ material is a base layer of $CeO_2$;
   wherein the surface of the layer of $CeO_2$ material is a first surface;
   wherein the base layer of $CeO_2$ includes a plurality of $CeO_2$ nanostructures projecting upwardly from the first surface and each having a second surface;
   wherein the first layer of praseodymium particles is disposed upon and dispersed across the second surface of each of the plurality of $CeO_2$ nanostructures; and
   wherein the second layer of a plurality of palladium particles is disposed upon and dispersed across the second surface of each of the plurality of $CeO_2$ nanostructures.

3. The three-way catalyst of claim 1, wherein the support material is 10% $CeO_2/Al_2O_3$, which was formed by impregnating Ce nitrate onto $Al_2O_3$ and a subsequent calcination at a temperature of from 500° C. to 1050° C. for from one hour to five hours.

4. The three-way catalyst of claim 1, wherein the support material is 10% $CeO_2/Al_2O_3$, which was created by Ce nitrate impregnation onto $Al_2O_3$ and a subsequent calcination at a temperature of 950° C. for two hours.

5. The three-way catalyst of claim 1, wherein the support material is 10% $CeO_2/Al_2O_3$ which was created by Ce nitrate impregnation onto $Al(OH)_x$ and a subsequent calcination at a temperature of 550° C. for two hours, wherein $(OH)_x$ is a hydroxide(s).

6. The three-way catalyst of claim 1, wherein the support material is 30% $CeO_2$—$Al_2O_3$.

7. The three-way catalyst of claim 6, wherein the support material is calcined at a temperature of from 500° C. to 1050° C. for two hours.

8. The three-way catalyst of claim 1, wherein the support material is 30% $CeO_2$—$Al_2O_3$ calcined at a temperature of 950° C. for two hours.

9. The three-way catalyst of claim 1, wherein the support material is $MO_x$—$Al_2O_3$.

10. The three-way catalyst of claim 9, wherein the support material is calcined at a temperature of 550° C. for two hours.

11. The three-way catalyst of claim 1, wherein the active component is $zPd\text{-}\delta Ce_n Pr_{1-n}O_x$, wherein z is from 0.1 to 1.5, δ is from 5.0 to 40, and n is from 0.70 to 0.95, and wherein $O_x$ is an oxide(s).

12. The three-way catalyst of claim 1, wherein the active component is selected from the group consisting of $0.8Pd\text{-}20Ce_{0.90}Pr_{0.10}O_x$ and $0.8Pd\text{-}30Ce_{0.90}Pr_{0.10}O_x$, and wherein $O_x$ is an oxide(s).

13. The three-way catalyst of claim 1, wherein the second layer of the plurality of palladium particles is formed from single atoms of palladium.

14. A device comprising:
    an internal combustion engine configured for producing an untreated exhaust gas flow; and
    a catalytic converter including a three-way catalyst, wherein the three-way catalyst facilitates chemical reactions to transform the untreated exhaust gas flow into a treated exhaust gas flow, the three-way catalyst including:
        an inert substrate; and
        a palladium catalyst material coating the inert substrate, the palladium catalyst material including:
            a support material formed from a material selected from the group consisting of 10% $CeO_2/Al_2O_3$, 20% $CeO_2$—$Al_2O_3$, 30% $CeO_2$—$Al_2O_3$, $Al_2O_3$, and $MO_x$—$Al_2O_3$, wherein M is a metal and includes at least one of copper, iron, manganese, titanium, zirconium, magnesium, strontium, and barium, and wherein $O_x$ is an oxide(s);
            a layer of $CeO_2$ material disposed upon the support material and having a surface, wherein the layer of $CeO_2$ material is dispersed on the surface of the support material; and
            an active component including:
                a first layer of praseodymium oxide particles disposed upon and dispersed across the surface of the layer of $CeO_2$ material; and
                a second layer of a plurality of palladium particles disposed upon and dispersed across the surface of the layer of $CeO_2$ material at a plurality of locations each corresponding to a respective location of each of the plurality of praseodymium particles.

15. The device of claim 14, wherein the active component is $zPd\text{-}\delta Ce_n Pr_{1-n}O_x$, wherein z is from 0.1 to 1.5, δ is from 5.0 to 40, and n is from 0.70 to 0.95, and wherein $O_x$ is an oxide(s).

16. The device of claim 14, wherein the active component is $0.8Pd\text{-}20Ce_{0.90}Pr_{0.10}O_x$, and wherein $O_x$ is an oxide(s).

17. The device of claim 14, wherein the active component is $0.8Pd\text{-}30Ce_{0.90}Pr_{0.10}O_x$, and wherein $O_x$ is an oxide(s).

18. The device of claim 14, wherein the second layer of the plurality of palladium particles is formed from single atoms of palladium.

19. A method of making a three-way catalyst, the method comprising:
    creating a palladium catalyst material, including:
        selecting a support material in the form of a powder formed from a material selected from the group consisting of 10% $CeO_2/Al_2O_3$, 20% $CeO_2$—$Al_2O_3$, 30% $CeO_2$—$Al_2O_3$, $Al_2O_3$, and $MO_x$—$Al_2O_3$, wherein M is a metal and includes at least one of copper, iron, manganese, titanium, zirconium, magnesium, strontium, and barium, and wherein $O_x$ is an oxide(s);
        providing a layer of Ce-containing material upon a surface of the support material;
        calcining the support material including the layer of Ce-containing material disposed on the surface;
        providing a layer of $CeO_2$ upon the surface of the support and the layer of Ce-containing material to form a precursor, the layer of $CeO_2$ having a first surface;
        calcining the precursor to form a calcined precursor;
        disposing a liquid co-impregnation composition upon the calcined precursor to form a product, wherein the liquid co-impregnation composition includes $CeO_2$, praseodymium, and palladium;
        calcining the product to create a plurality of $CeO_2$ structures projecting upwardly from the first surface and an active component upon the product, wherein each of the plurality of $CeO_2$ structures have a second surface, the active component including:
            a first layer of praseodymium particles disposed upon and dispersed across the second surface of each of the plurality of $CeO_2$ nanostructures; and
            a second layer of a plurality of palladium particles disposed upon and dispersed across the second surface of each of the plurality of $CeO_2$ nanostructures at a plurality of locations each corresponding to a respective location of each of the plurality of praseodymium particles;
    creating a slurry with the palladium catalyst material;
    coating an inert substrate of the three-way catalyst with the slurry; and
    drying the slurry upon the inert substrate.

20. The method of claim 19, wherein the active component is $zPd\text{-}\delta Ce_n Pr_{1-n}O_x$, wherein z is from 0.1 to 1.5, δ is from 5.0 to 40, and n is from 0.70 to 0.95, and wherein $O_x$ is an oxide(s).

* * * * *